US010712886B2

(12) United States Patent
Tsai et al.

(10) Patent No.: US 10,712,886 B2
(45) Date of Patent: Jul. 14, 2020

(54) TOUCH PANEL AND ELECTRICAL DEVICE

(71) Applicant: HIMAX TECHNOLOGIES LIMITED, Tainan (TW)

(72) Inventors: Cheng-Hung Tsai, Tainan (TW); Ying-Zhuan Liu, Tainan (TW); Xue-Xia Cai, Tainan (TW); Yuan-Ting Chen, Tainan (TW); Jui-Ni Li, Tainan (TW); Wai-Pan Wu, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 78 days.

(21) Appl. No.: 16/152,427

(22) Filed: Oct. 5, 2018

(65) Prior Publication Data

US 2019/0391687 A1 Dec. 26, 2019

Related U.S. Application Data

(60) Provisional application No. 62/687,777, filed on Jun. 20, 2018.

(51) Int. Cl.
*G09G 5/00* (2006.01)
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04111* (2013.01)

(58) Field of Classification Search
CPC ........ G06F 3/044; G06F 3/041; G06F 3/0412; G06F 3/0416; G06F 2203/04111; G06F 2203/04105; G06F 2203/04107; G06F 2203/04112; H01L 33/38; H01L 33/62

USPC ........................................ 345/174; 178/18.06
See application file for complete search history.

(56) References Cited

U.S. PATENT DOCUMENTS

| 2015/0317019 | A1* | 11/2015 | Lee ......................... G06F 3/044 345/174 |
| 2017/0010701 | A1* | 1/2017 | Tsai ......................... G06F 3/041 |
| 2017/0192588 | A1 | 7/2017 | Zou |
| 2019/0220114 | A1* | 7/2019 | Shu ........................ G06F 3/0446 |
| 2019/0369811 | A1* | 12/2019 | Hsu ........................ G06F 3/0445 |

FOREIGN PATENT DOCUMENTS

| CN | 101847066 A | 9/2010 |
| CN | 108153018 A | 6/2018 |
| TW | 201602853 A | 1/2016 |

\* cited by examiner

*Primary Examiner* — Jennifer T Nguyen
(74) *Attorney, Agent, or Firm* — CKC & Partners Co., LLC

(57) ABSTRACT

A sensing unit in the touch panel includes a first electrode formed in a first film and a second electrode formed in a second film. The first electrode includes multiple extending portions and at least one connecting portion. The extending portions extend along a first direction. The connecting portion extends along a second direction which is different from the first direction. The extending portions are spaced from each other by a distance along the second direction, and the connecting portion connects the extending portions. The second electrode includes a circular pad having an opening. The extending portions at least partially overlap with the circular pad, and the connecting portion is formed in an area overlapping with the opening.

16 Claims, 10 Drawing Sheets

|  | RX1 | RX2 | RX3 | RX4 | RX5 | RX6 | RX7 | RX8 | RX9 | RX10 |
|---|---|---|---|---|---|---|---|---|---|---|
| TX1 | 0 | 0 | 0 | 0 | 0 | 0 | 0 | 0 | 0 | 0 |
| TX2 | 0 | 0 | 0 | 0 | 0 | 0 | 0 | 0 | 0 | 0 |
| TX3 | 0 | 0 | 0 | 0 | 10 | 11 | 0 | 0 | 0 | 0 |
| TX4 | 0 | 0 | 0 | 45 | 68 | 68 | 48 | 0 | 0 | 0 |
| TX5 | 0 | 0 | 22 | 54 | 28 | 26 | 47 | 36 | 0 | 0 |
| TX6 | 0 | 0 | 38 | 45 | 23 | 28 | 53 | 23 | 0 | 0 |
| TX7 | 0 | 0 | 0 | 51 | 69 | 67 | 44 | 0 | 0 | 0 |
| TX8 | 0 | 0 | 0 | 0 | 10 | 12 | 0 | 0 | 0 | 0 |
| TX9 | 0 | 0 | 0 | 0 | 0 | 0 | 0 | 0 | 0 | 0 |
| TX10 | 0 | 0 | 0 | 0 | 0 | 0 | 0 | 0 | 0 | 0 |

FIG. 11

TOUCH PANEL AND ELECTRICAL DEVICE

RELATED APPLICATIONS

This application claims priority to U.S. Provisional Application Ser. No. 62/687,777, filed Jun. 20, 2018, which is herein incorporated by reference.

BACKGROUND

Field of Invention

The present invention relates to a touch panel. More particularly, the present invention relates to a layout structure of a capacitive touch panel.

Description of Related Art

Input devices of electrical products have been changed from conventional keyboards and mice to touch panels so as to cope with the demands for convenience, miniaturization, and being user-friendly. At present, the touch panels can be generally classified into capacitive, resistive, optical, acoustic-wave and electromagnetic touch panels. Among these touch panels, the resistive touch panels and the capacitive touch panels are most common.

In general, the capacitive touch panel has multiple sensing electrodes, multiple signal lines, and a controller. When the user does not touch the touch panel, there is a capacitance initial value between the sensing electrodes. When the user touches the touch panel, the touched sensing electrode may generate a mutual capacitance, thereby changing the original capacitance initial value. The controller may determine the user's touch position by identifying the position of the electrode whose capacitance value is changed.

When the user holds the electrical product, a touch object (e.g., the user's finger) and the electrical product are connected to the same reference voltage (e.g., ground voltage). Thus, when the user holds the electrical product, the controller may easily identify the user's touch position. When the user does not hold the electrical product, the electrical product is likely in a floating-connecting state (i.e., low ground mode). Thus, the reference voltage of the electrical product may be different from the voltage of the touch object (e.g., the user's finger or a touch pen). Thus, when the user does not hold the electrical product, the controller may not easily identify the user's touch position.

SUMMARY

A touch panel is provided and includes a first film, a second film, and multiple sensing units. The sensing units includes a first sensing unit which includes a first electrode formed in the first film and a second electrode formed in the second film, and the first electrode does not contact the second electrode. The first electrode includes multiple extending portions and at least one connecting portion. The extending portions extend along a first direction. The connecting portion extends along a second direction which is different from the first direction. The extending portions are spaced from each other by a distance along the second direction, and the connecting portion connects the extending portions. The second electrode includes a circular pad having an opening. The extending portions at least partially overlap with the circular pad, and the connecting portion is formed in an area overlapping with the opening.

In some embodiments, a number of the connecting portion is more than one, and the connecting portions are spaced from each other by a distance along the first direction.

In some embodiments, the sensing units further include a second sensing unit which is adjacent to the first sensing unit along the second direction, and the second sensing unit includes a first electrode and a second electrode. The first electrode of the second sensing unit includes multiple extending portions and at least one connecting portion. The second electrode of the second sensing unit includes a circular pad. The connecting portion of the second sensing unit is aligned with the connecting portion of the first sensing unit along the second direction.

In some embodiments, the first electrode of the second sensing unit is connected to the first electrode of the first sensing unit. The first electrode of the second sensing unit further includes a protruding portion which extends toward a direction opposite to the first sensing unit and at least partially overlaps with the circular pad of the second sensing unit.

In some embodiments, the touch panel further includes: a first signal line connecting to the first electrode of the first sensing unit and the first electrode of the second sensing unit; a second signal line connecting to the second electrode of the first sensing unit; and a third signal line connecting to the second electrode of the second sensing unit.

In some embodiments, the circular pad of the first sensing unit is aligned with the circular pad of the second sensing unit along the second direction. The second signal line extends along the second direction and around the circular pad of the second sensing unit. The third signal line extends in parallel with the second direction and around the circular pad of the first sensing unit.

In some embodiments, the second signal line is connected to the circular pad of the first sensing unit from a third direction, wherein an angle between the third direction and the first direction is greater than 0 degree and less than 90 degrees. The third signal line is connected to the circular pad of the second sensing unit from the third direction.

In some embodiments, the second signal line is spaced from the circular pad of the second sensing unit by a first distance along the first direction. The third signal line is spaced from the circular pad of the first sensing unit by a second distance along the first direction, in which the second distance is equal to the first distance.

In some embodiments, the touch panel has a display area and a non-display area, in which the sensing units are disposed in the display area. The touch panel further includes multiple signal lines connecting to the sensing units respectively. The signal lines include multiple first signal lines partially disposed in the display area and multiple second signal lines disposed in the non-display area. The first signal lines have transparent conductive material, and the second signal lines have metal material.

In some embodiments, the touch panel further includes a sensing circuit connected to the signal lines. Distances between the sensing units to which the first signal lines connect and the sensing circuit are shorter than distances between the sensing units to which the second signal lines connect and the sensing circuit.

In some embodiments, the signal lines extend along the second direction to connect to the sensing circuit. The sensing units include multiple edge sensing units arranged along the second direction and adjacent to the non-display area. Areas of the edge sensing units are smaller than areas of other sensing units.

From another aspect, an electrical device is provided and includes the aforementioned touch panel.

BRIEF DESCRIPTION OF THE DRAWINGS

The invention can be more fully understood by reading the following detailed description of the embodiment, with reference made to the accompanying drawings as follows.

FIG. 11 is a diagram illustrating a table including mutual capacitance characteristic values of the sensing units.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
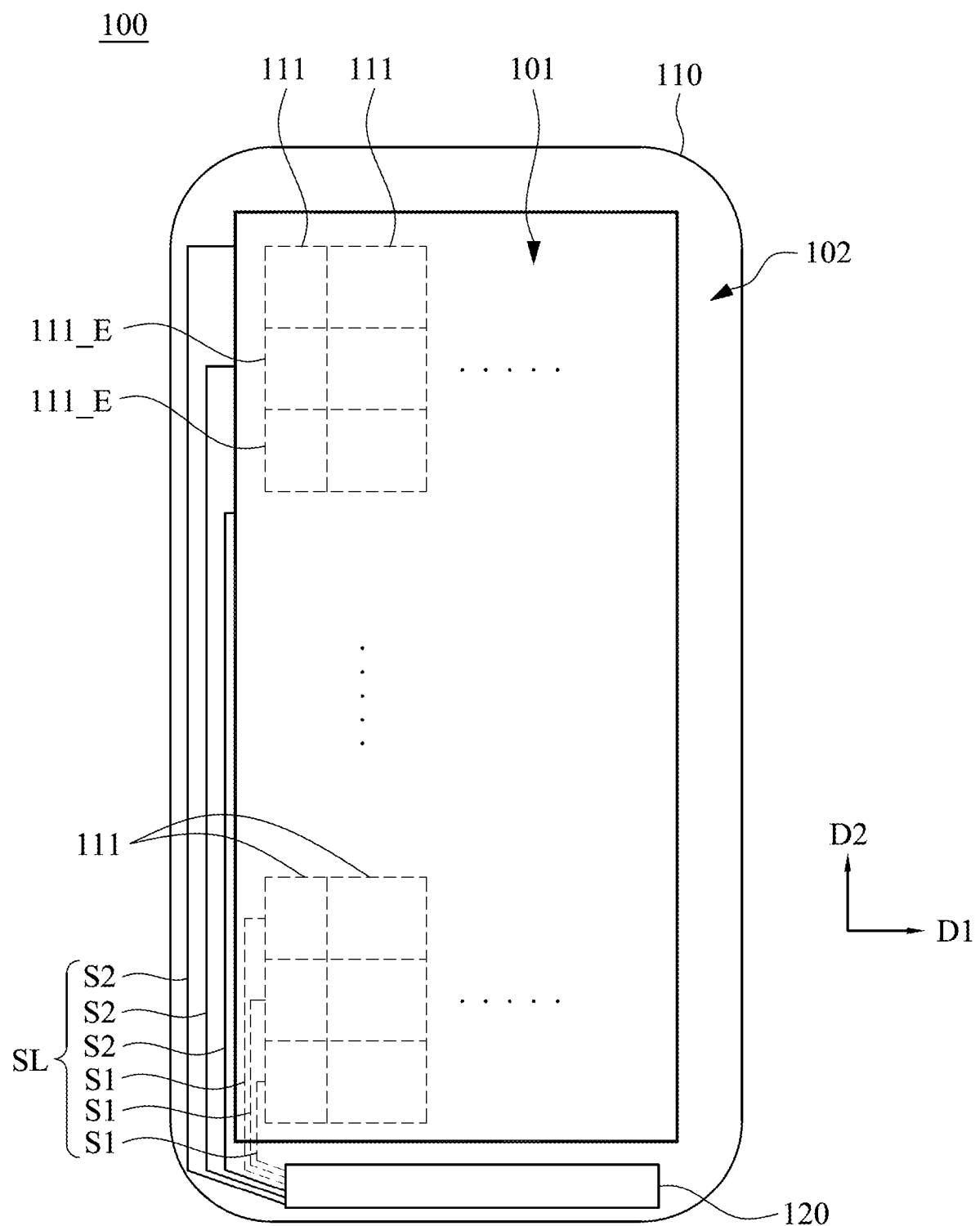
FIG. 1 is a schematic diagram illustrating an electrical device in accordance with an embodiment.

FIG. 1 is a schematic diagram illustrating an electrical device in accordance with an embodiment. Referring to FIG. 1, an electrical device 100 is implemented as a cell phone in the embodiment, but the electrical device may also be implemented as a laptop, a tablet, an industrial computer, or any forms of computer in other embodiments. The electrical device 100 includes a touch panel 110 and a display panel (not shown in FIG. 1) disposed under the touch panel 110. The touch panel 110 has a display area 101 and a non-display area 102. Multiple sensing units 111 are disposed in the display area 101 (for simplification, not all sensing units are shown and labeled in FIG. 1). The sensing units 111 are arranged as a matrix along a first direction D1 and a second direction D2 for sensing a touch operation on the touch panel 110. However, the arrangement of the sensing units 111 are not limited in the invention. The touch panel 110 further includes multiple signal lines SL which are electrically connected to the sensing units 111 and a sensing circuit 120. Each of the sensing units 111 includes a transmitting electrode (also referred to as TX) and a receiving electrode (also referred to as RX), and each signal line SL may be electrically connected to the transmitting electrode and/or the receiving electrode.

In some embodiments, the signal lines SL includes multiple first signal lines S1 and multiple second signal lines S2. Each of the first signal lines S1 at least partially disposed in the display area 101, and each of the second signal lines S2 is disposed in the non-display area 102. The portions of the first signal lines S1 disposed in the display area 101 have transparent conductive material such as indium tin oxide (ITO), indium zinc oxide (IZO), antimony tin oxide (ATO), fluorine tin oxide (FTO), or other transparent and conductive material. The second signal lines S2 have metal material such as silver, copper, or other suitable metal material. The border width of the touch panel 110 may be reduced because part of the signal lines SL is disposed in the display area 101, resulting in that the number of the signal lines SL required to be disposed in the non-display area 102 is reduced. In some embodiments, since the resistance of the transparent conductive material is larger than that of the metal material, the first signal lines S1 are connected to the sensing units that are closer to the sensing circuit 120. To be specific, distances between the sensing units 111 (at the lower portion of the touch panel 110) to which the first signal lines S1 connect and the sensing circuit 120 are shorter than distances between the sensing units 111 (at the upper portion of the touch panel 110) to which the second signal lines S2 connect and the sensing circuit 120.

In some embodiments, some space at the left-hand side of the display area 101 has to be reserved to accommodate the first signal lines S1, and therefore the space originally designed for the sensing units 111 are occupied, and thereby areas of the sensing units 111 adjacent to the non-display area 102 may be relatively smaller. To be specific, the signal lines SL extend along the second direction D2 to connect to the sensing circuit 120. Some of the sensing units 111 that are arranged along the second direction D2 and adjacent to the non-display area 102 are referred to as edge sensing units (e.g. edge sensing units 111_E). In particular, the areas of the edge sensing units 111_E are smaller than that of other sensing units 111. The structure of the sensing units 111 will be described in detail below.

Figure 2:
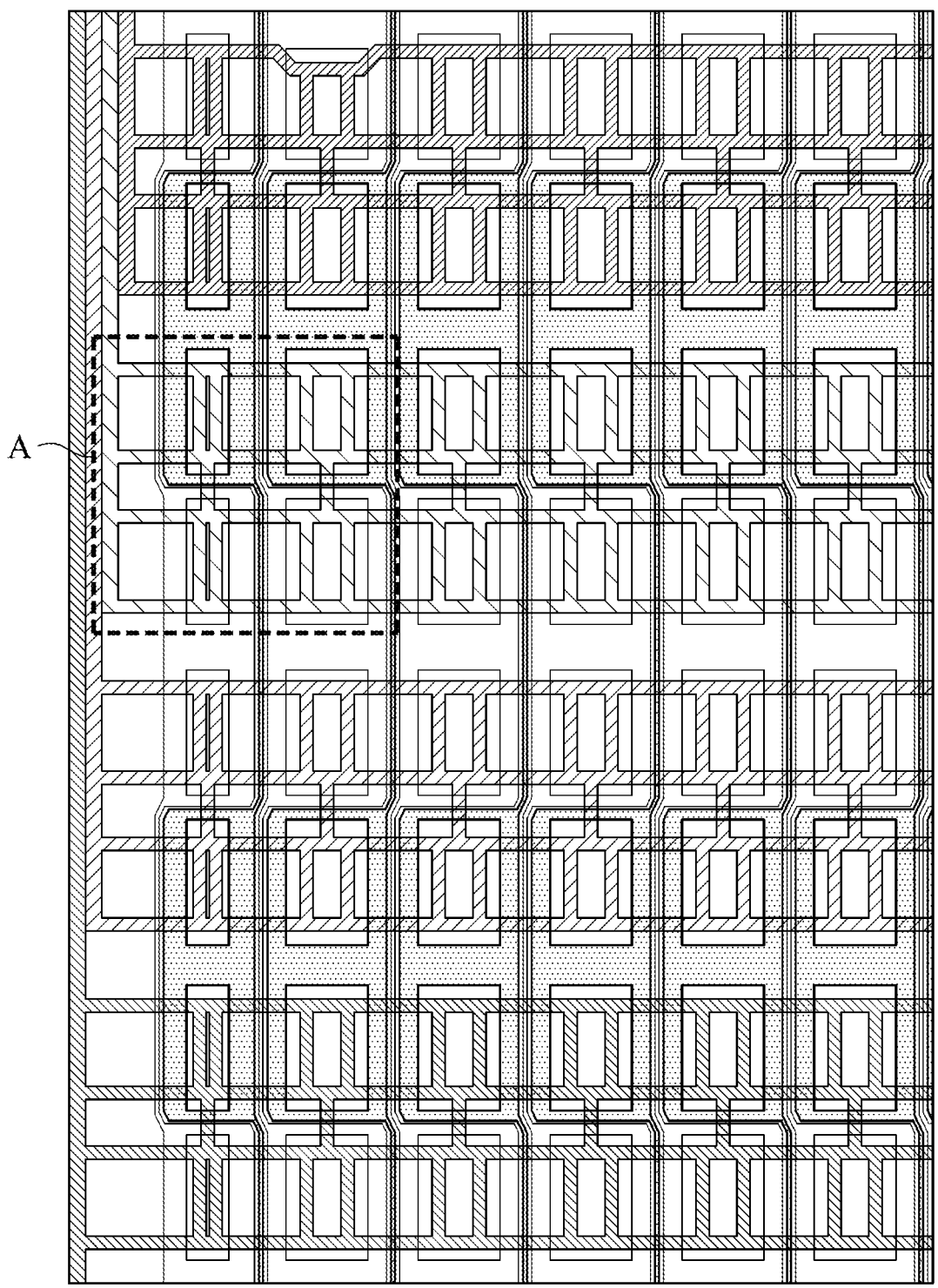
FIG. 2 is a top view of multiple sensing units in accordance with an embodiment.
Figure 3:
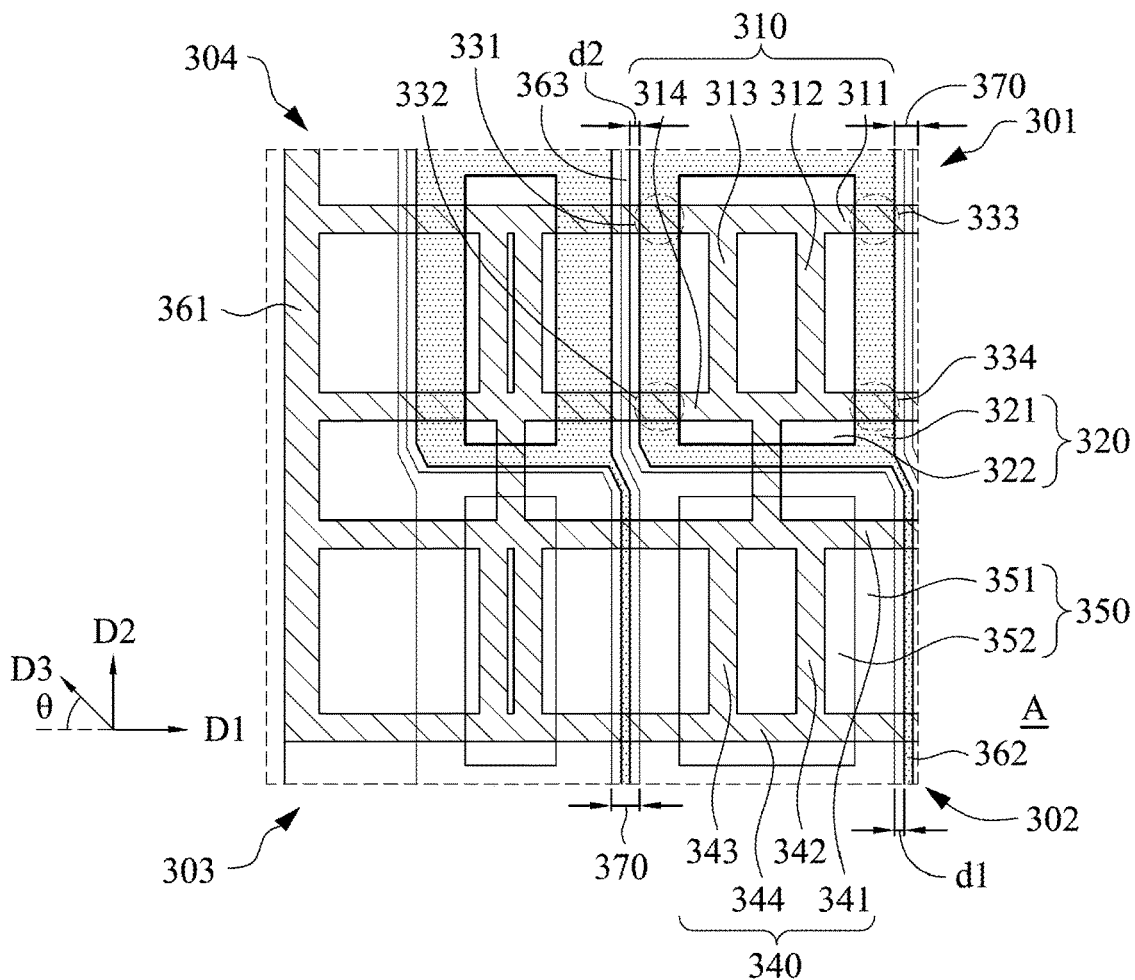
FIG. 3 is an enlarged diagram of an area A of FIG. 2.
Figure 4:
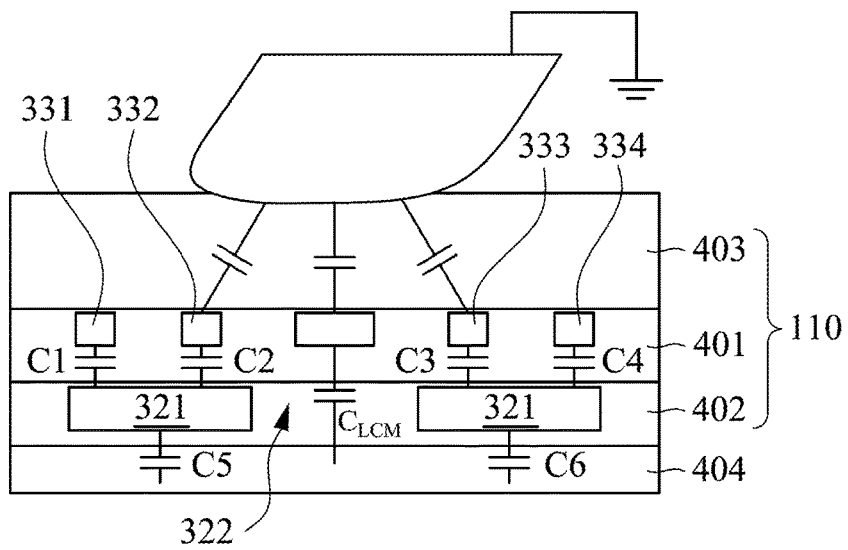
FIG. 4 is a circuit diagram of one sensing unit in accordance with an embodiment.

FIG. 2 is a top view of multiple sensing units in accordance with an embodiment. FIG. 3 is an enlarged diagram of an area A of FIG. 2. FIG. 4 is a circuit diagram of one sensing unit in accordance with an embodiment. The touch panel 110 is a glass-film-film (GFF) touch panel in the embodiment. In other words, two sensing electrodes of each sensing unit 111 are disposed on two films respectively, and the two films would be bonded to a protection cover to form the touch panel 110. To be specific, four sensing units 301-304 are shown in FIG. 3, the two sensing units 301 and 302 are referred to a first sensing unit and a second sensing unit respectively. FIG. 4 shows the circuit diagram of the first sensing unit 301 which is taken as an example for illustration.

Referring to FIG. 3 and FIG. 4, the touch panel 110 includes a protection cover 403, a first film 401, and a second film 402. A display panel 404 is disposed under the touch panel 110. The first sensing unit 301 includes a first electrode 310 formed in the first film 401 and a second electrode 320 formed in the second film 402, in which the first electrode 310 does not contact the second electrode 320. The first electrode 310 includes extending portions 311, 314 that extend along the first direction D1 and connecting portions 312, 313 that extend along the second direction D2. The extending portions 311, 314 would connect to extending portions of adjacent sensing unit along the first direction D1, and they are spaced from each other by a distance along the second direction D2. The connecting portions 312, 312 connect the extending portions 311, 314. The second electrode 320 includes a circular pad 321 having an opening 322. The extending portions 311, 314 at least partially overlap with the circular pad 321 to form mutual capacitors. For example, the extending portions 311 has segments 331, 333, and the extending portions 314 has segments 332, 334. A capacitor C1 is formed by the segment 331 and circular pad 321; a capacitor C2 is formed by the segment 332 and the circular pad 321; a capacitor C3 is formed by the segment 333 and the circular pad 321; a capacitor C4 is formed by the segment 334 and the circular pad 321; and capacitors C5 and C6 are formed by the circular pad 321 and the display panel 404. In addition, the connecting portions 312, 313 are disposed in an area overlapping with the opening 322. In some embodiments, the connecting portions 312, 313 do not overlap with the circular pad 321. A capacitor $C_{LCM}$ is formed by the portion of the first electrode 310 (including the connecting portions 312, 313 and part of the extending portions 311, 314) that overlaps with the opening 322 and any metal structure (e.g. scan lines or data lines) in the display panel 404. In the embodiment, the first electrode 310 overlaps with the second electrode 320 at several locations because there are multiple extending portions 311, 314, and this configuration increases the mutual capacitance between the first electrode 310 and the second electrode 320. Consequently, the performance in the low ground mode is improved. Experimental data will be provided below.

The areas of the connecting portions 312, 313 may be arbitrarily designed to adjust the capacitance $C_{LCM}$. Larger areas of the connecting portions 312, 313 result in that a user can "touch" larger first electrode 310; smaller areas of the connecting portions 312, 313 result in smaller capacitance $C_{LCM}$ that prevents the touch panel 110 from being affected by the signals transmitted in the display panel 404. There are two connecting portions 312, 313 spaced from each other by a distance along the first direction D1 in the embodiment for reducing the areas of the connecting portions 312, 313. However, the number of the connecting portions may be more or less than 2 while the area of each connecting portion may be adjusted arbitrarily which is not limited in the invention.

The material of the first film 401 and the second film 402 may include polymer, polyethylene terephthalate (PET), polycarbonate (PC), polyether sulfone (PES), triacetyl cellulose (TAC), PMMA, polyethylene, COP, polyimide (PI), and a compound material constituted by PC and PMMA, which is not limited in the invention. The material of the first electrode and the second electrode may include indium tin oxide (ITO), indium zinc oxide (IZO), antimony tin oxide (ATO), fluorine tin oxide (FTO) or other conductive and transparent material such as a Nano-metal wire (e.g. nano-silver wire, nano-copper wire).

The second sensing unit 302 will be described herein. The second sensing unit 302 includes a first electrode 340 formed in the first film 401 and a second electrode 350 formed in the second film 402. The first electrode 340 includes extending portions 341, 344 that extend along the first direction D1 and connecting portion 342, 343 that extend along the second direction D2. The connecting portions 342, 343 connect the extending portions 341, 344. The second electrode 350 includes a circular pad 351 having an opening 352. The structure of the second sensing unit 302 is similar to that of the first sensing unit 301, and therefore the detail description will not be repeated. In particular, the second sensing unit 302 is adjacent to the first sensing unit 301 along the second direction D2, and the connecting portions 342, 343 of the second sensing unit 302 are aligned with the connecting portions 312, 313 of the first sensing unit 301 along the second direction D2. In other words, if the connecting portions 342, 343 extend upward along the second direction D2, they will overlap with the connecting portions 312, 313 respectively; or say, the positions of the connecting portions 342, 343 relative to the second sensing unit 302 are equal to the positions of the connecting portions 312, 313 relative to the first sensing unit 301 respectively. If the connecting portions 342, 343 are not aligned with the connecting portions 312, 313, for example, the connecting portions 342, 343 are shifted to the right (or left), then the effective sensing position of the second sensing unit 302 will be also be shifted to the right (or left) relative to the sensing position of the first sensing unit 301, causing inconsistent sensing positions of the sensing units in the same column of sensing units.

In this embodiment, the first electrodes 310, 340 serve as transmitting electrodes, and the second electrodes 320, 350 serve as receiving electrodes. However, the invention is not limited thereto. The first electrodes 310, 340 may serve as receiving electrodes and the second electrodes 320, 350 may serve as transmitting electrodes in other embodiments. Note that the first electrode 310 is connected to the first electrode 340, and they are connected to the sensing circuit (not shown in FIG. 3) through a same signal line 361. In addition, a signal line 362 is connected to the second electrode 320 of the first sensing unit 301, and a signal line 363 is connected to the second electrode 350 of the second sensing unit 302. The signal lines 362, 363 are electrically insulated from the each other. This configuration is also referred to "1T2R" for reducing the number of the signal lines at the left and/or right hand sides of the non-display area 102, thereby reducing the border width. In detail, the circular pad 321 is aligned with the circular pad 351 along the second direction D2. The signal line 362 extends in parallel with the second direction D2 and around the circular pad 351. The signal line 363 extends along the second direction D2 and around the circular pad 321. This configuration is to keep the sizes and shapes of the circular pads 321, 351 consistent.

In some embodiments, the signal line 362 is connected to the circular pad 321 from a third direction D3. The angle θ formed by the third direction D3 and the first direction D1 is greater than 0 degree and less than 90 degrees. For example, the angle θ is 45 degrees. In addition, the signal line 363 is connected to the circular pad 351 from the third direction D3.

There is a blind area 370 between two adjacent sensing units (e.g. sensing units 301, 304) along the first direction D1. At least one sensing line is disposed in the blind area, and the distances between the signal line and the adjacent circular pads would be the same. For example, the signal line 362 is spaced from the circular pad 351 by a first distance d1 along the first direction D1, and the signal line 363 is spaced from the circular pad 321 by a second distance d2 along the first direction D1, in which the first distance d1 is equal to the second distance d2. Consequently, the signal lines 362, 363 are arranged in the middle of the corresponding blind area 370. That is, the signal lines in the same blind area are aligned with each other along the second direction D2 (as shown in FIG. 2).

In the embodiments of FIG. 2 and FIG. 3, the sensing units 303, 304 are the aforementioned edge sensing units. The areas of the sensing units 303, 304 are smaller than that of the sensing units 301, 302. The distance between the connecting portions of the first electrode of the sensing units 303, 304 will be shorter than that of the connecting portions of the first electrode of the sensing units 301, 302. Or, in some embodiments, only one connecting portion is disposed in the first electrode of the sensing units 303, 304.

Figure 5:
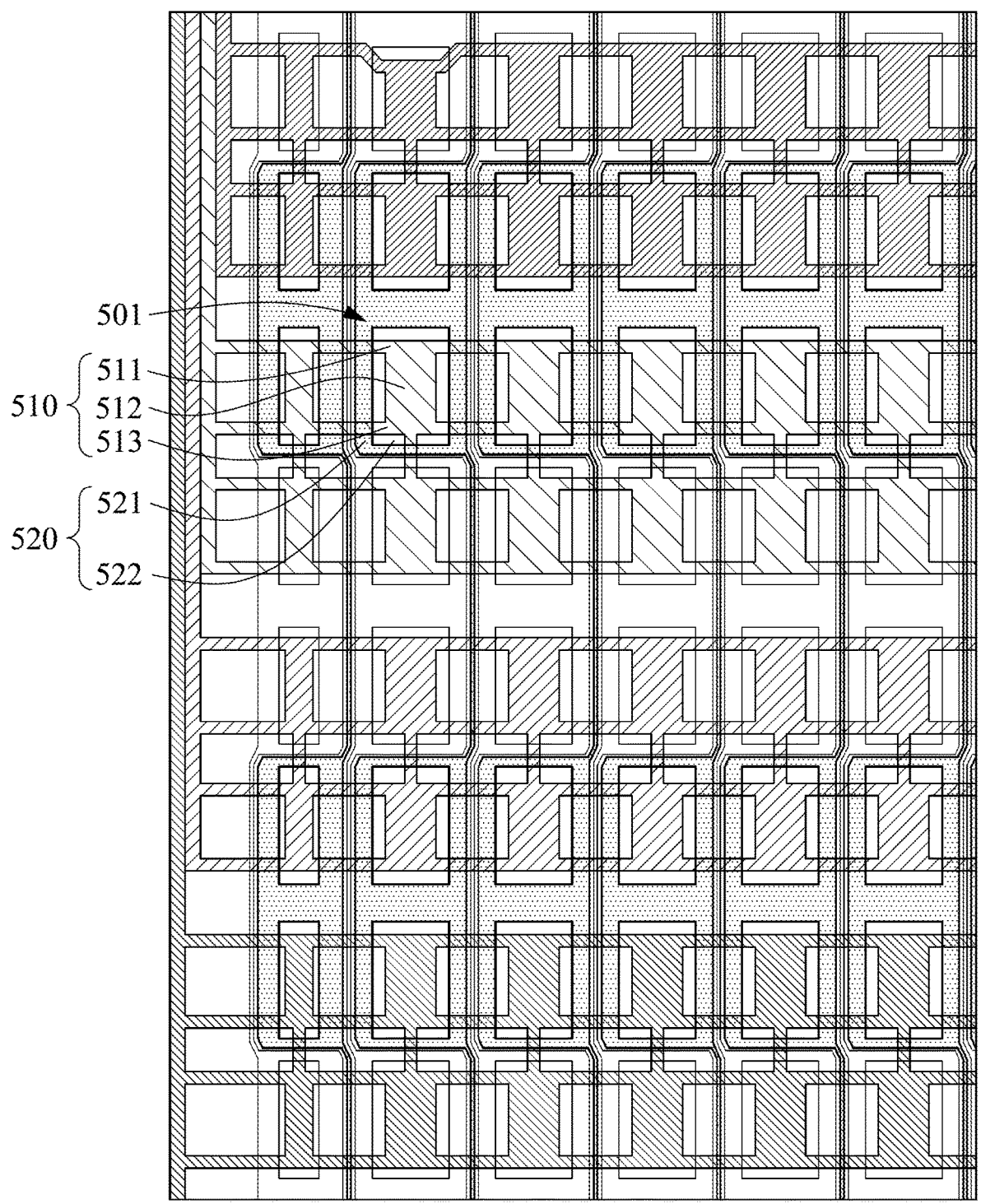
FIG. 5 to FIG. 9 are top views of the sensing units in accordance with embodiments.

FIG. 5 is a top view of the sensing units in accordance with an embodiment. The difference between FIG. 2 and FIG. 5 is the configuration of the connecting portion in the first electrode. For example, a sensing unit 501 includes a first electrode 510 and a second electrode 520. The first electrode 510 includes extending portions 511, 513 and a connecting portion 512 which connects the extending portions 511, 513. The second electrode 520 includes a circular pad 521 having an opening 522. In the embodiment of FIG. 5, each first electrode 510 only include one connecting portion 512, and the area of the connecting portion 512 is larger than that of the connecting portion in FIG. 2.

Figure 6:
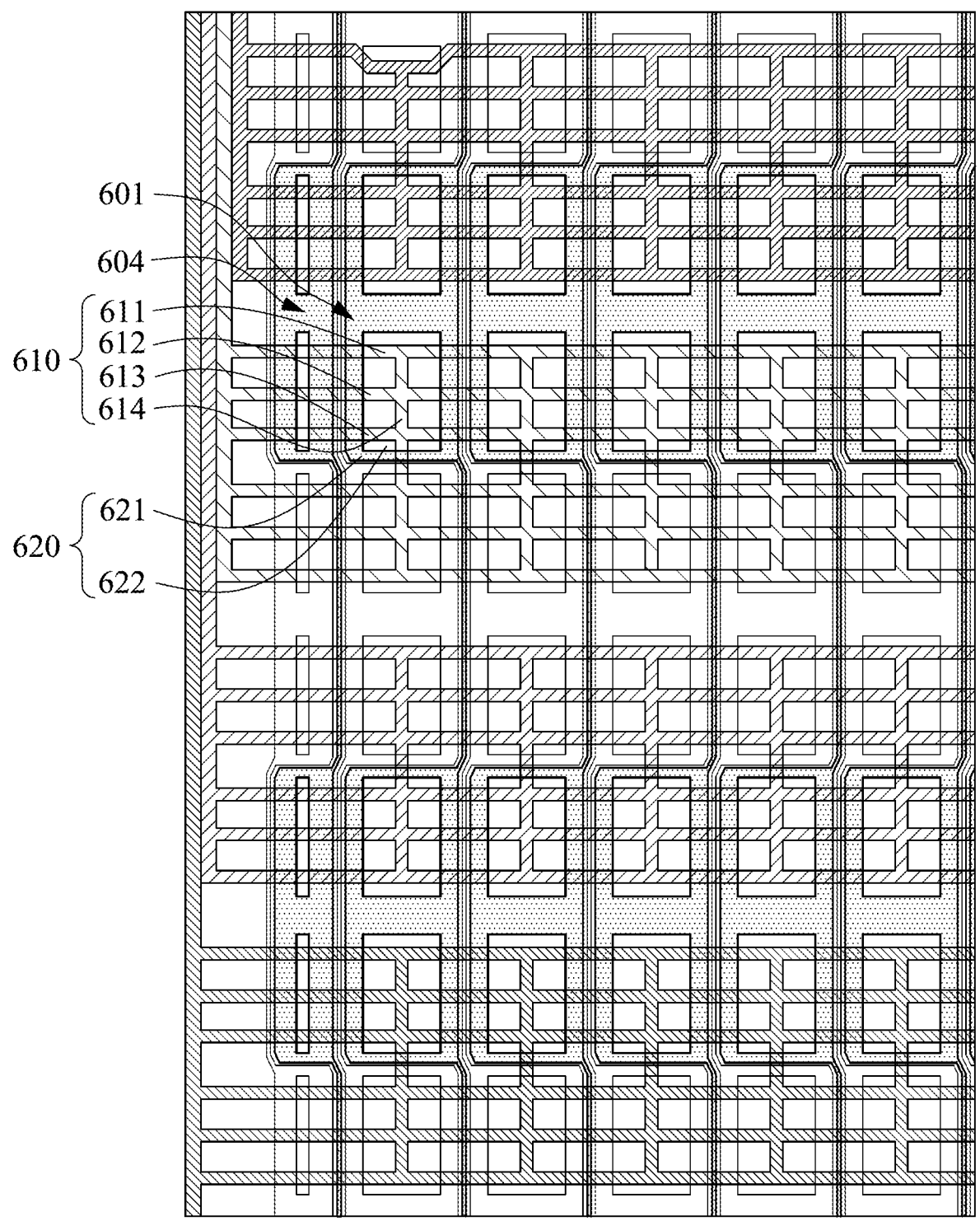

FIG. 6 is a top view of the sensing units in accordance with an embodiment. The difference between FIG. 2 and FIG. 6 is the numbers of the extending portions and the connecting portion. For example, a sensing unit 601 includes a first electrode 610 and a second electrode 620. The first electrode 610 includes extending portions 611-613 and a connecting portion 614. The second electrode 620 includes a circular pad 621 having an opening 622. In the embodiment of FIG. 6, each first electrode includes three extending portions, and therefore the first electrode 610 overlaps with the second electrode 620 at more locations for increasing the mutual capacitance. Note that no connecting portion is disposed in the first electrode of the edge sensing unit 601 in the embodiment of FIG. 6.

Figure 7:
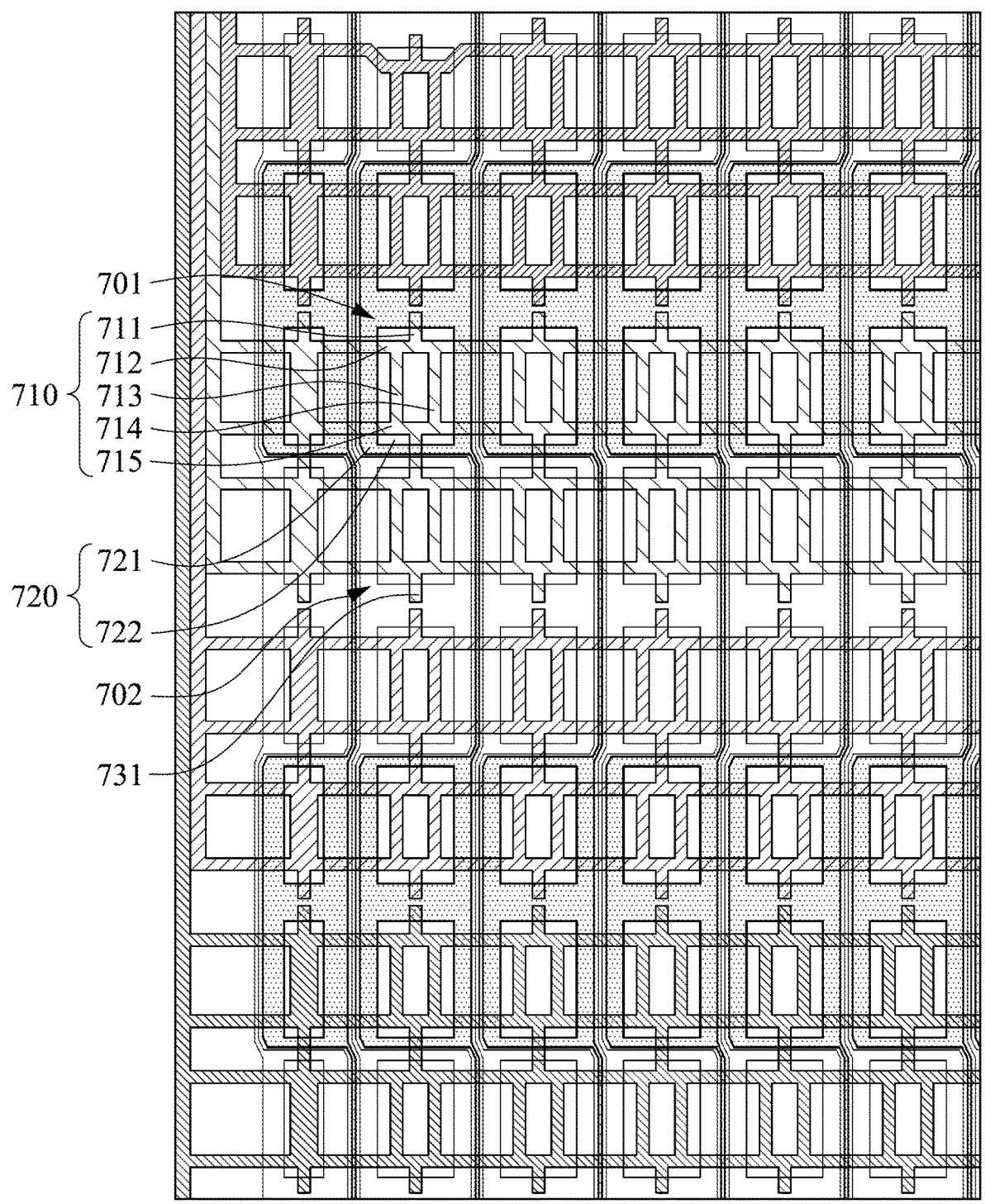
Figure 8:
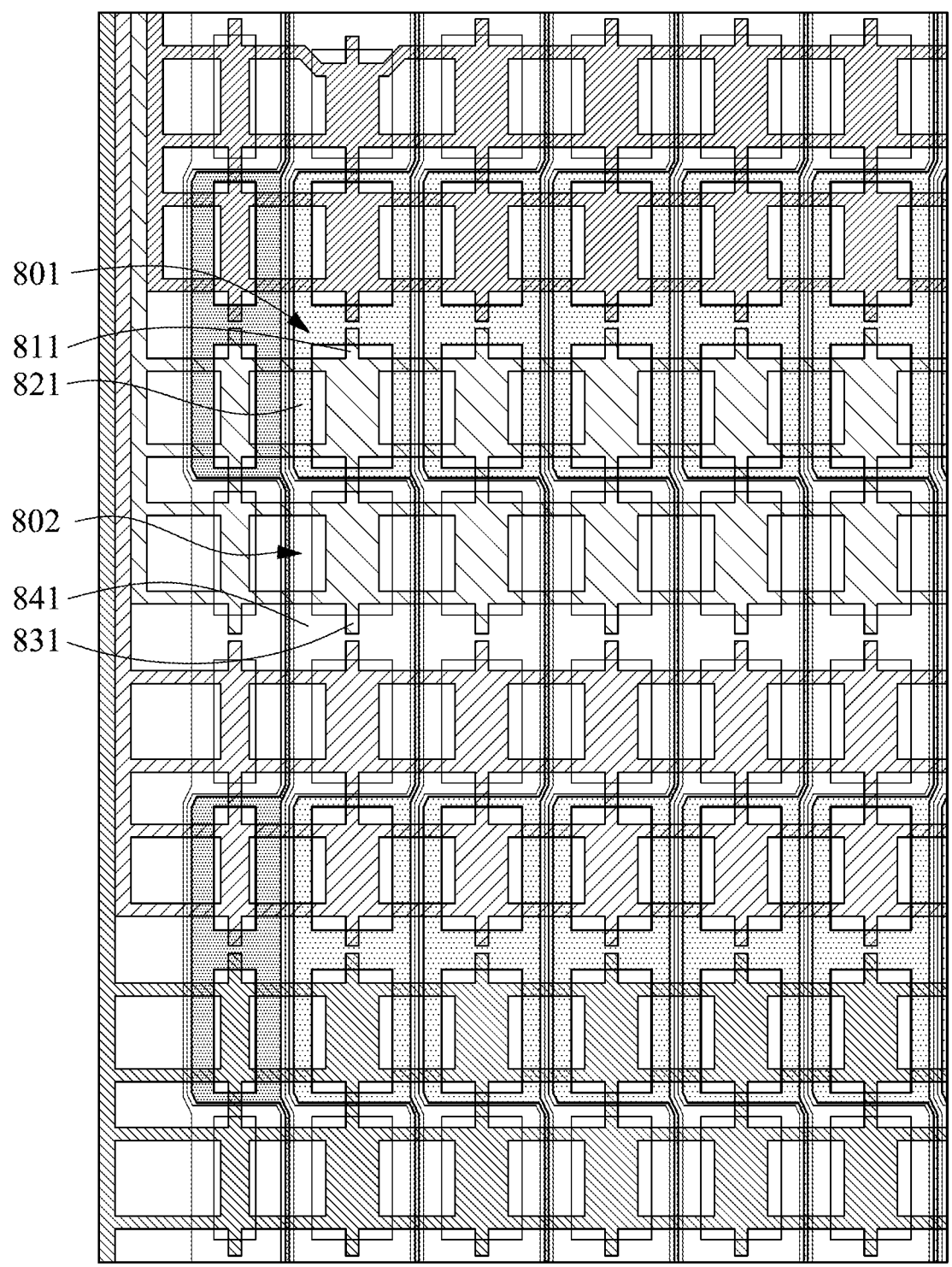
Figure 9:
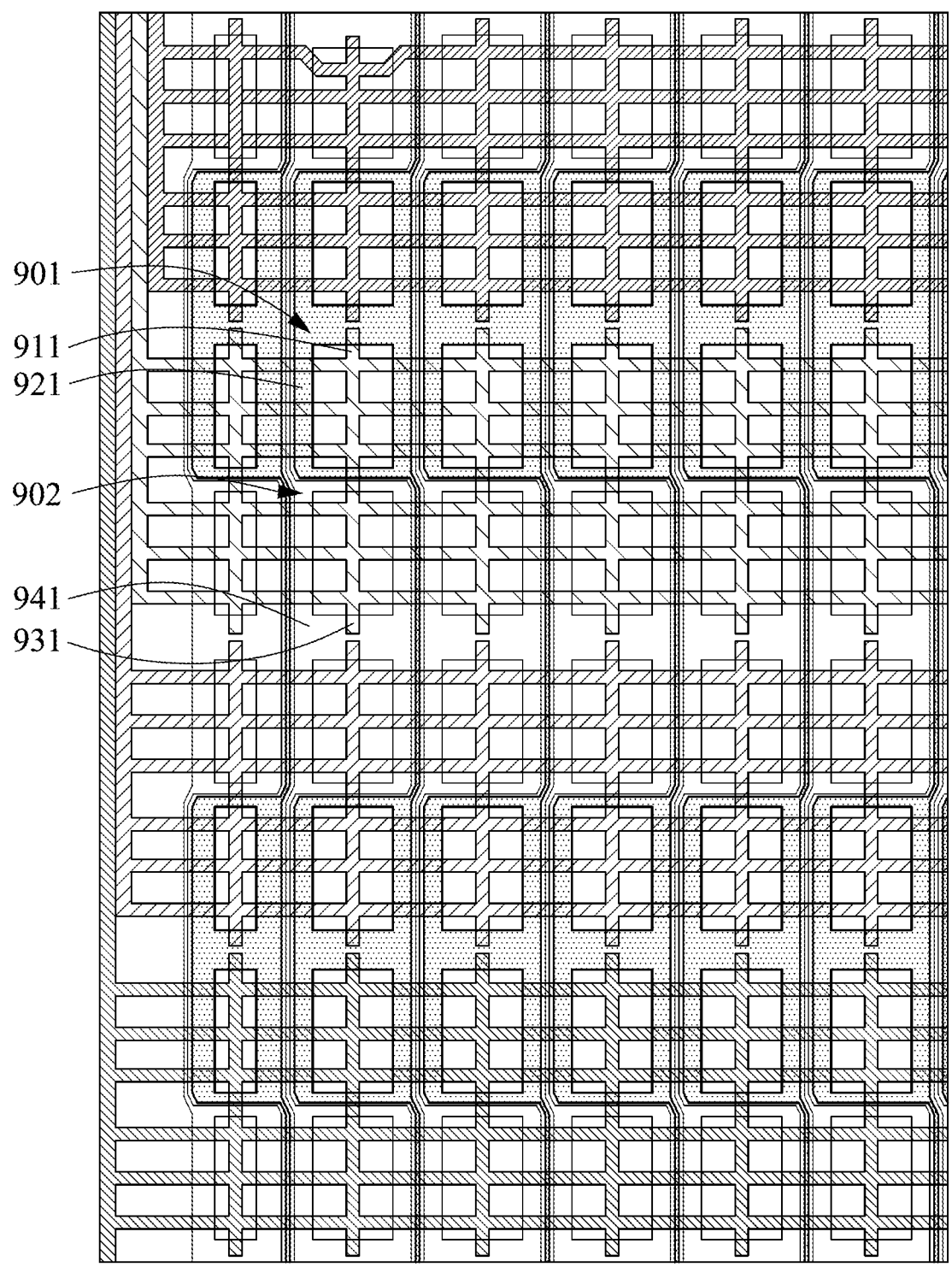

FIG. 7 is a top view of the sensing units in accordance with an embodiment. The difference between FIG. 2 and FIG. 7 is an additional protruding portion formed in the first electrode. For example, a sensing unit 701 includes a first electrode 710 and a second electrode 720. The first electrode 710 includes a protruding portion 711, extending portions 712, 715, and connecting portions 713, 714. The second electrode 720 includes a circular pad 721 having an opening 722. The protruding portion 711 extends toward a direction opposite to the sensing unit 702 and at least partially overlaps with the circular pad 721. Furthermore, a sensing unit 702 includes a protruding portion 731 extending toward a direction opposite to sensing unit 701 and at least partially overlaps with the circular pad of the sensing unit 702. This configuration is to keep the first electrode in each sensing unit consistent. The configuration of the protruding portion may be applied to FIG. 5 and FIG. 6. For example, referring to FIG. 8, in a sensing unit 801, a protruding portion 811 extends toward a direction opposite to a sensing unit 802 and at least partially overlaps with a circular pad 821. In the sensing unit 802, a protruding portion 831 extends toward a direction opposite to the sensing unit 801 and at least partially overlaps with a circular pad 841. Referring to FIG. 9, in a sensing unit 901, a protruding portion 911 extends toward a direction opposite to a sensing unit 902 and at least partially overlaps with a circular pad 921. In the sensing unit 902, a protruding portion 931 extends toward a direction opposite to the sensing unit 901 and at least partially overlaps with a circular pad 941.

Figure 10:
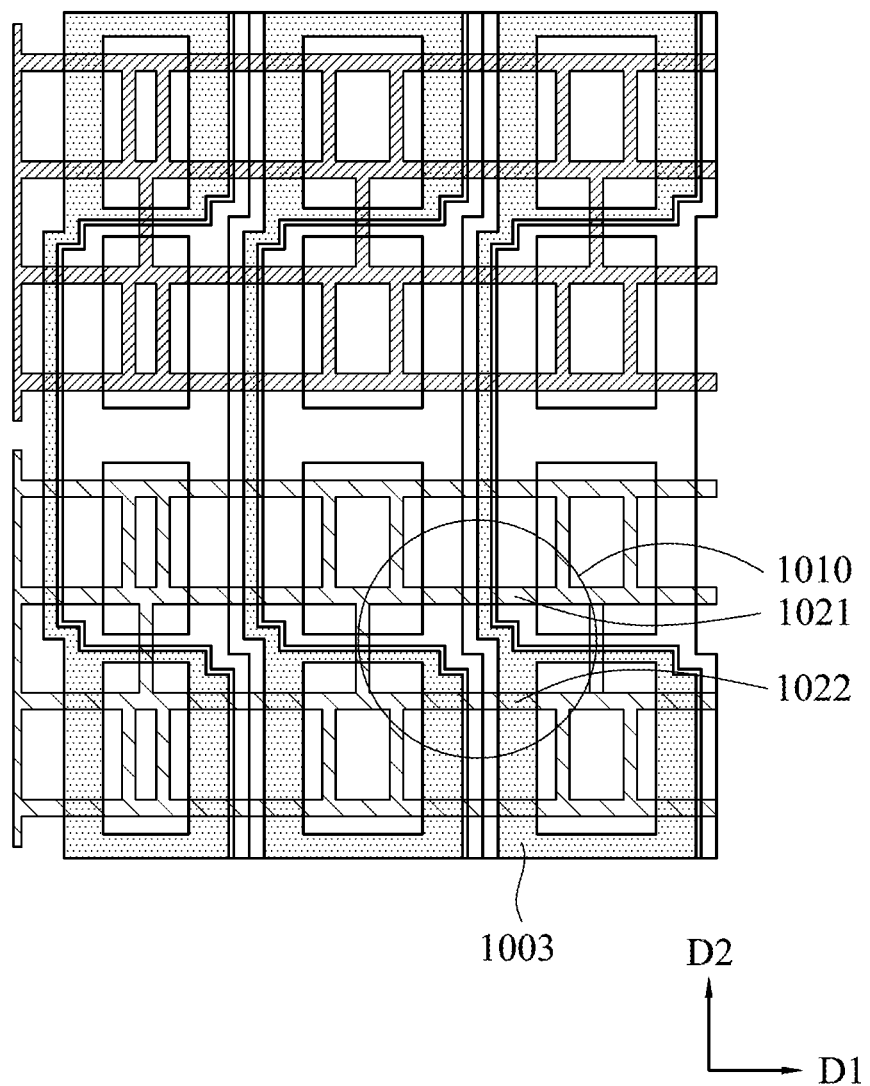
FIG. 10 is a schematic diagram of a copper cylinder test in a low ground mode in accordance with an embodiment.

FIG. 10 is a schematic diagram of a copper cylinder test in a low ground mode in accordance with an embodiment. FIG. 11 is a diagram illustrating a table including mutual capacitance characteristic values of the sensing units. Referring to FIG. 10 and FIG. 11, an area 1010 is referred to the area touched by a copper cylinder. The mutual capacitance characteristic values in the table of FIG. 11 are just for illustration and they do not have units, in which RX1-RX10 are referred to different receiving electrodes, and TX1-TX10 are referred to different transmitting electrodes. FIG. 10 and FIG. 11 show that the mutual capacitance characteristic values around the area 1010 (labeled as bold) are larger than surrounding mutual capacitance characteristic values, and therefore the copper cylinder can still be detected in the low ground mode. Note that this result is produced because multiple extending portions are disposed in each sensing unit such that a distance between the extending portions 1021, 1022 of different sensing units may be reduced, resulting in that the area 1010 can cover larger first electrode. In addition, the design of the aligned connecting portion and the aligned circular pad also improves the copper cylinder sensitivity uniformity.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising:
   a first film;
   a second film; and
   a plurality of sensing units comprising a first sensing unit, wherein the first sensing unit comprises a first electrode formed in the first film and a second electrode formed in the second film, and the first electrode does not contact the second electrode,
   wherein the first electrode comprises a plurality of extending portions and at least one connecting portion, the extending portions extend along a first direction, the at least one connecting portion extends along a second direction which is different from the first direction, the extending portions are spaced from each other by a distance along the second direction, and the at least one connecting portion connects the extending portions,
   wherein the second electrode comprises a circular pad having an opening, the extending portions at least partially overlap with the circular pad, and the at least one connecting portion is formed in an area overlapping with the opening,
   wherein the sensing units further comprise a second sensing unit which is adjacent to the first sensing unit along the second direction, and the second sensing unit comprises a first electrode and a second electrode,
   wherein the first electrode of the second sensing unit comprises a plurality of extending portions and at least one connecting portion,
   wherein the second electrode of the second sensing unit comprises a circular pad,
   wherein the at least one connecting portion of the second sensing unit is aligned with the at least one connecting portion of the first sensing unit along the second direction,
   wherein the first electrode of the second sensing unit is connected to the first electrode of the first sensing unit,
   wherein the first electrode of the second sensing unit further comprises a protruding portion which extends toward a direction opposite to the first sensing unit and at least partially overlaps with the circular pad of the second sensing unit.

2. The touch panel of claim 1, wherein a number of the at least one connecting portion is more than one, and the connecting portions are spaced from each other by a distance along the first direction.

3. The touch panel of claim 1, further comprising:
a first signal line connecting to the first electrode of the first sensing unit and the first electrode of the second sensing unit;
a second signal line connecting to the second electrode of the first sensing unit; and
a third signal line connecting to the second electrode of the second sensing unit.

4. The touch panel of claim 3, wherein the circular pad of the first sensing unit is aligned with the circular pad of the second sensing unit along the second direction, the second signal line extends along the second direction and around the circular pad of the second sensing unit, and the third signal line extends in parallel with the second direction and around the circular pad of the first sensing unit.

5. The touch panel of claim 4, wherein the second signal line is connected to the circular pad of the first sensing unit from a third direction, wherein an angle between the third direction and the first direction is greater than 0 degree and less than 90 degrees,
wherein the third signal line is connected to the circular pad of the second sensing unit from the third direction.

6. The touch panel of claim 5, wherein the second signal line is spaced from the circular pad of the second sensing unit by a first distance along the first direction,
wherein the third signal line is spaced from the circular pad of the first sensing unit by a second distance along the first direction, and the second distance is equal to the first distance.

7. The touch panel of claim 1, wherein the touch panel has a display area and a non-display area, the sensing units are disposed in the display area, and the touch panel further comprises a plurality of signal lines connecting to the sensing units respectively,
wherein the signal lines comprise a plurality of first signal lines partially disposed in the display area and a plurality of second signal lines disposed in the non-display area,
wherein the first signal lines have transparent conductive material, and the second signal lines have metal material.

8. The touch panel of claim 7, further comprising a sensing circuit connected to the signal lines, wherein distances between the sensing units to which the first signal lines connect and the sensing circuit are shorter than distances between the sensing units to which the second signal lines connect and the sensing circuit.

9. The touch panel of claim 8, wherein the signal lines extend along the second direction to connect to the sensing circuit, the sensing units comprise a plurality of edge sensing units arranged along the second direction and adjacent to the non-display area,
wherein areas of the edge sensing units are smaller than areas of other sensing units.

10. An electrical device comprising:
a touch panel, comprising:
a first film;
a second film; and
a plurality of sensing units comprising a first sensing unit, wherein the first sensing unit comprises a first electrode formed in the first film and a second electrode formed in the second film, and the first electrode does not contact the second electrode,
wherein the first electrode comprises a plurality of extending portions and at least one connecting portion, the extending portions extend along a first direction, the at least one connecting portion extends along a second direction which is different from the first direction, the extending portions are spaced from each other by a distance along the second direction, and the at least one connecting portion connects the extending portions,
wherein the second electrode comprises a circular pad having an opening, the extending portions at least partially overlap with the circular pad, and the at least one connecting portion is formed in an area overlapping with the opening,
wherein the sensing units further comprise a second sensing unit which is adjacent to the first sensing unit along the second direction, and the second sensing unit comprises a first electrode and a second electrode,
wherein the first electrode of the second sensing unit comprises a plurality of extending portions and at least one connecting portion,
wherein the second electrode of the second sensing unit comprises a circular pad,
wherein the at least one connecting portion of the second sensing unit is aligned with the at least one connecting portion of the first sensing unit along the second direction,
wherein the first electrode of the second sensing unit is connected to the first electrode of the first sensing unit,
wherein the first electrode of the second sensing unit further comprises a protruding portion which extends toward a direction opposite to the first sensing unit and at least partially overlaps with the circular pad of the second sensing unit.

11. The electrical device of claim 10, wherein a number of the at least one connecting portion is more than one, and the connecting portions are spaced from each other by a distance along the first direction.

12. The electrical device of claim 10, wherein the touch panel further comprises:
a first signal line connecting to the first electrode of the first sensing unit and the first electrode of the second sensing unit;
a second signal line connecting to the second electrode of the first sensing unit; and
a third signal line connecting to the second electrode of the second sensing unit.

13. The electrical device of claim 12, wherein the circular pad of the first sensing unit is aligned with the circular pad of the second sensing unit along the second direction, the second signal line extends along the second direction and around the circular pad of the second sensing unit, and the third signal line extends in parallel with the second direction and around the circular pad of the first sensing unit.

14. The electrical device of claim 13, wherein the second signal line is connected to the circular pad of the first sensing unit from a third direction, wherein an angle between the third direction and the first direction is greater than 0 degree and less than 90 degrees,
wherein the third signal line is connected to the circular pad of the second sensing unit from the third direction.

15. The electrical device of claim 14, wherein the second signal line is spaced from the circular pad of the second sensing unit by a first distance along the first direction,
wherein the third signal line is spaced from the circular pad of the first sensing unit by a second distance along the first direction, and the second distance is equal to the first distance.

16. The electrical device of claim 10, wherein the touch panel has a display area and a non-display area, the sensing units are disposed in the display area, and the touch panel further comprises a plurality of signal lines connecting to the sensing units respectively,
- wherein the signal lines comprise a plurality of first signal lines partially disposed in the display area and a plurality of second signal lines disposed in the non-display area,
- wherein the first signal lines have transparent conductive material, and the second signal lines have metal material.

* * * * *